(12) United States Patent
Cox

(10) Patent No.: US 8,499,726 B2
(45) Date of Patent: Aug. 6, 2013

(54) INTERNAL COMBUSTION ENGINES

(75) Inventor: David Cox, London (GB)

(73) Assignee: Cox Powertrain Ltd., London (GB)

( * ) Notice: Subject to any disclaimer, the term of this patent is extended or adjusted under 35 U.S.C. 154(b) by 754 days.

(21) Appl. No.: 12/663,519

(22) PCT Filed: May 28, 2008

(86) PCT No.: PCT/GB2008/001798
§ 371 (c)(1),
(2), (4) Date: Apr. 12, 2010

(87) PCT Pub. No.: WO2008/149061
PCT Pub. Date: Dec. 11, 2008

(65) Prior Publication Data
US 2010/0192923 A1    Aug. 5, 2010

(30) Foreign Application Priority Data

Jun. 6, 2007 (GB) .................. 0710852.5

(51) Int. Cl.
*F01B 7/12* (2006.01)
*F02B 25/08* (2006.01)
*F02B 75/28* (2006.01)

(52) U.S. Cl.
USPC .................. 123/51 BC; 123/55.2; 123/188.5; 123/53.3

(58) Field of Classification Search
USPC ................ 123/51 BC, 55.2, 188.5, 53.3
See application file for complete search history.

(56) References Cited

U.S. PATENT DOCUMENTS

| | | | |
|---|---|---|---|
| 1,257,104 A * | 2/1918 | Olson et al. | 123/62 |
| 2,093,433 A | 9/1937 | Greene | |
| 2,132,802 A * | 10/1938 | Pierce | 123/291 |
| 2,169,807 A * | 8/1939 | Lyon | 417/488 |
| 2,213,817 A * | 9/1940 | Kinslow | 123/50 R |
| 6,065,440 A * | 5/2000 | Pasquan | 123/198 F |
| 6,170,443 B1 * | 1/2001 | Hofbauer | 123/51 B |
| 2002/0056432 A1 * | 5/2002 | Matsuda et al. | 123/195 R |
| 2004/0221823 A1 | 11/2004 | Warren | |

FOREIGN PATENT DOCUMENTS

| | | |
|---|---|---|
| DE | 195 03 443 C1 | 5/1996 |
| DE | 19503442 | 5/1996 |
| GB | 690479 | 11/1948 |
| JP | S33-5358 | 7/1958 |
| JP | 11-002347 | 6/1999 |
| JP | 2006-002803 | 5/2006 |
| WO | 03016701 A | 2/2003 |
| WO | 2007/057660 A1 | 5/2007 |

* cited by examiner

*Primary Examiner* — Lindsay Low
(74) *Attorney, Agent, or Firm* — Steptoe & Johnson LLP

(57) ABSTRACT

The invention provides a 2-stroke internal combustion engine comprising two opposed cylinders, each cylinder housing two opposed pistons and having at least one exhaust port and at least one intake port, and a crankshaft having asymmetrically arranged journals and scotch-yoke mechanisms for driving the journals from the pistons. The pistons in each cylinder operate to open its exhaust port or ports before its intake port or ports and to close its exhaust port or ports before its intake port or ports.

20 Claims, 15 Drawing Sheets

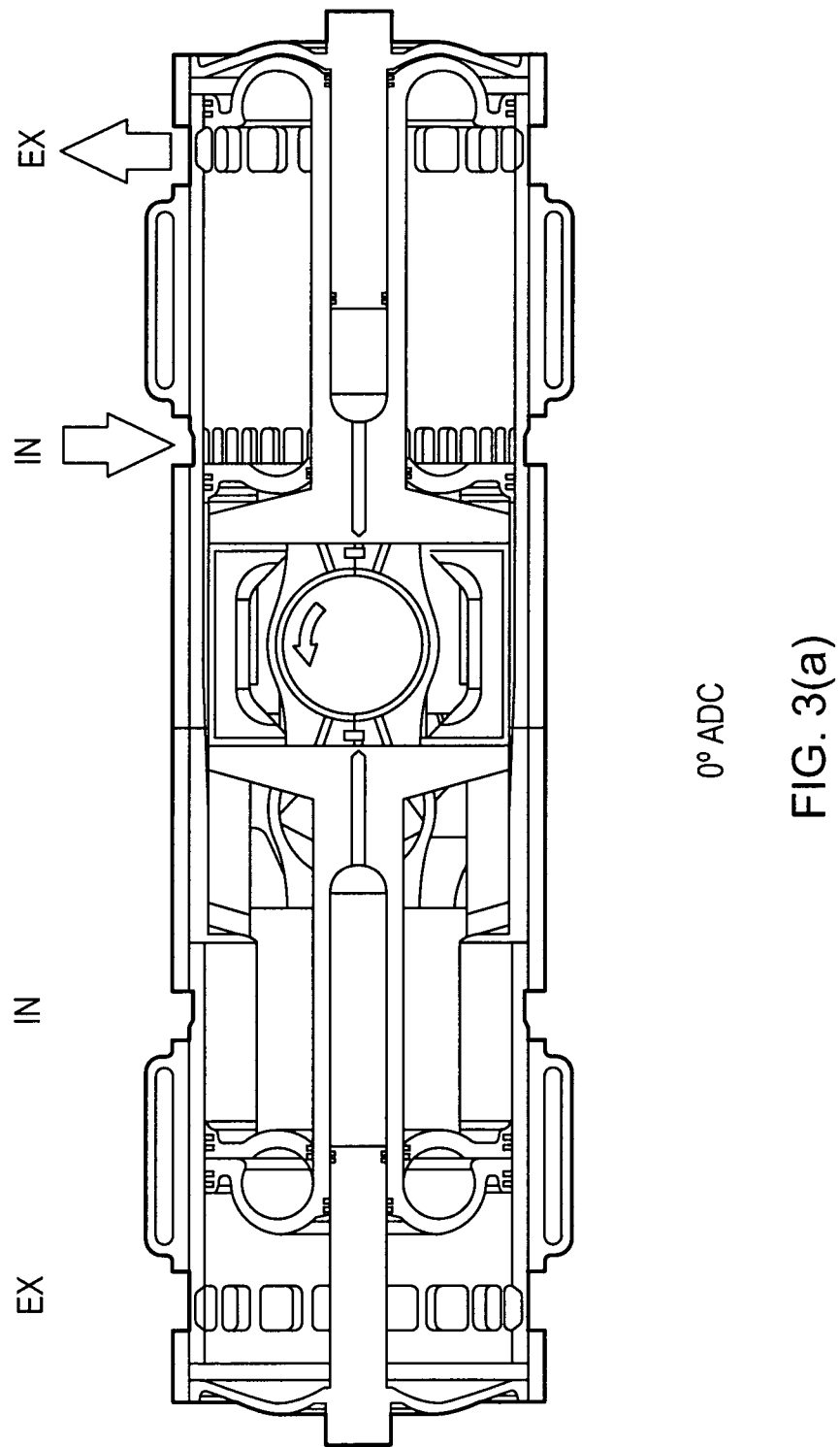
FIG. 3(a) 0° ADC

30° ADC

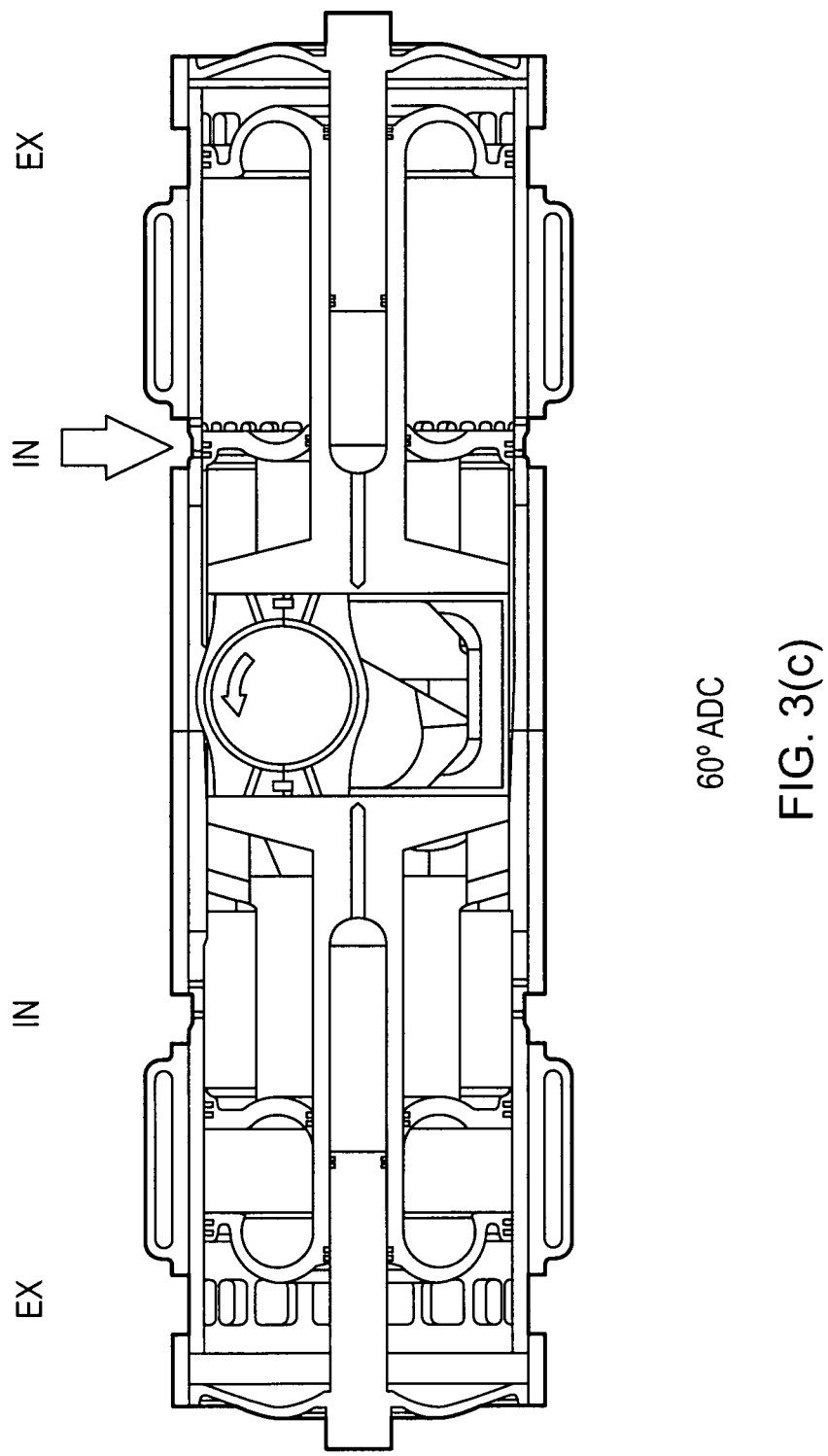
FIG. 3(c)  60° ADC

150° ADC

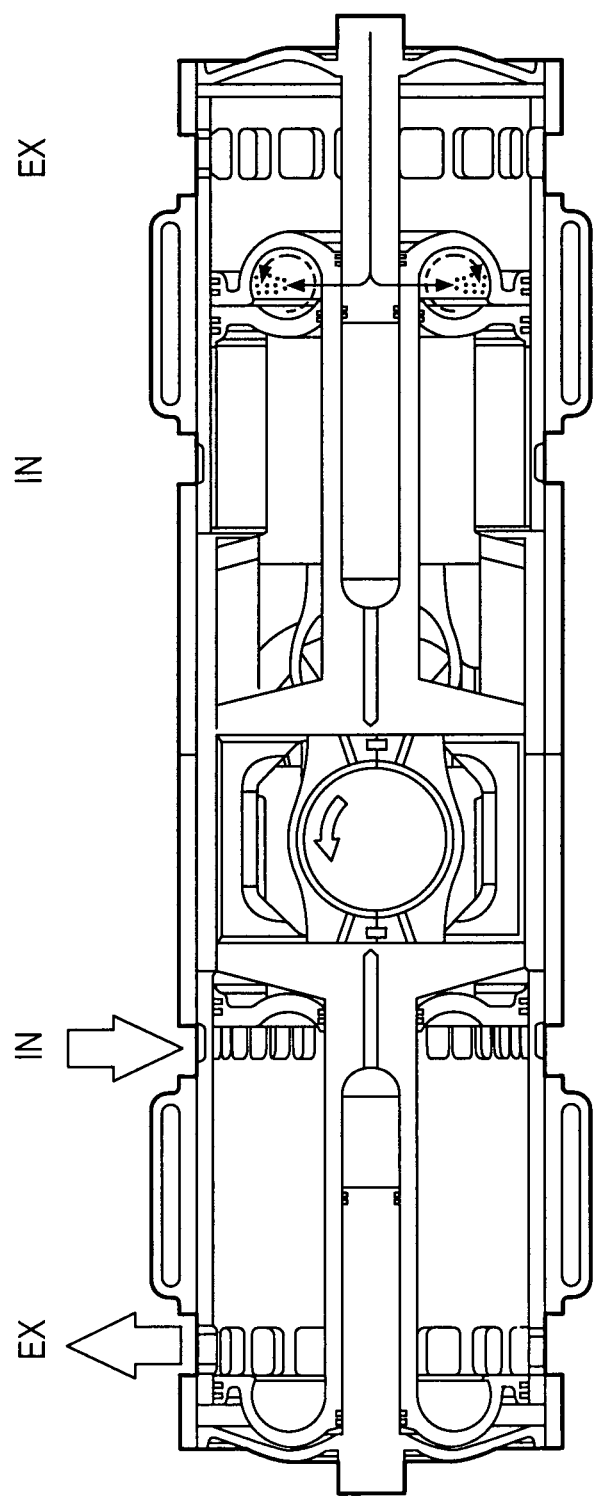
FIG. 3(g)  180° ADC

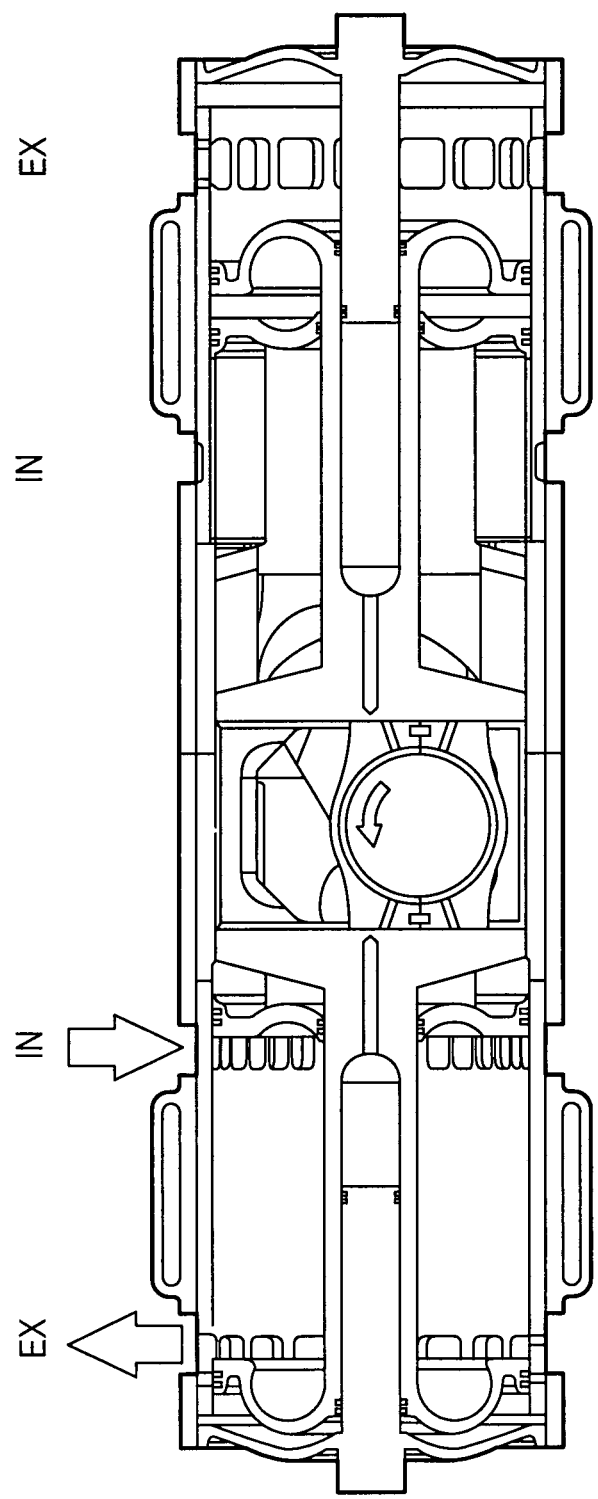
FIG. 3(h)  210° ADC

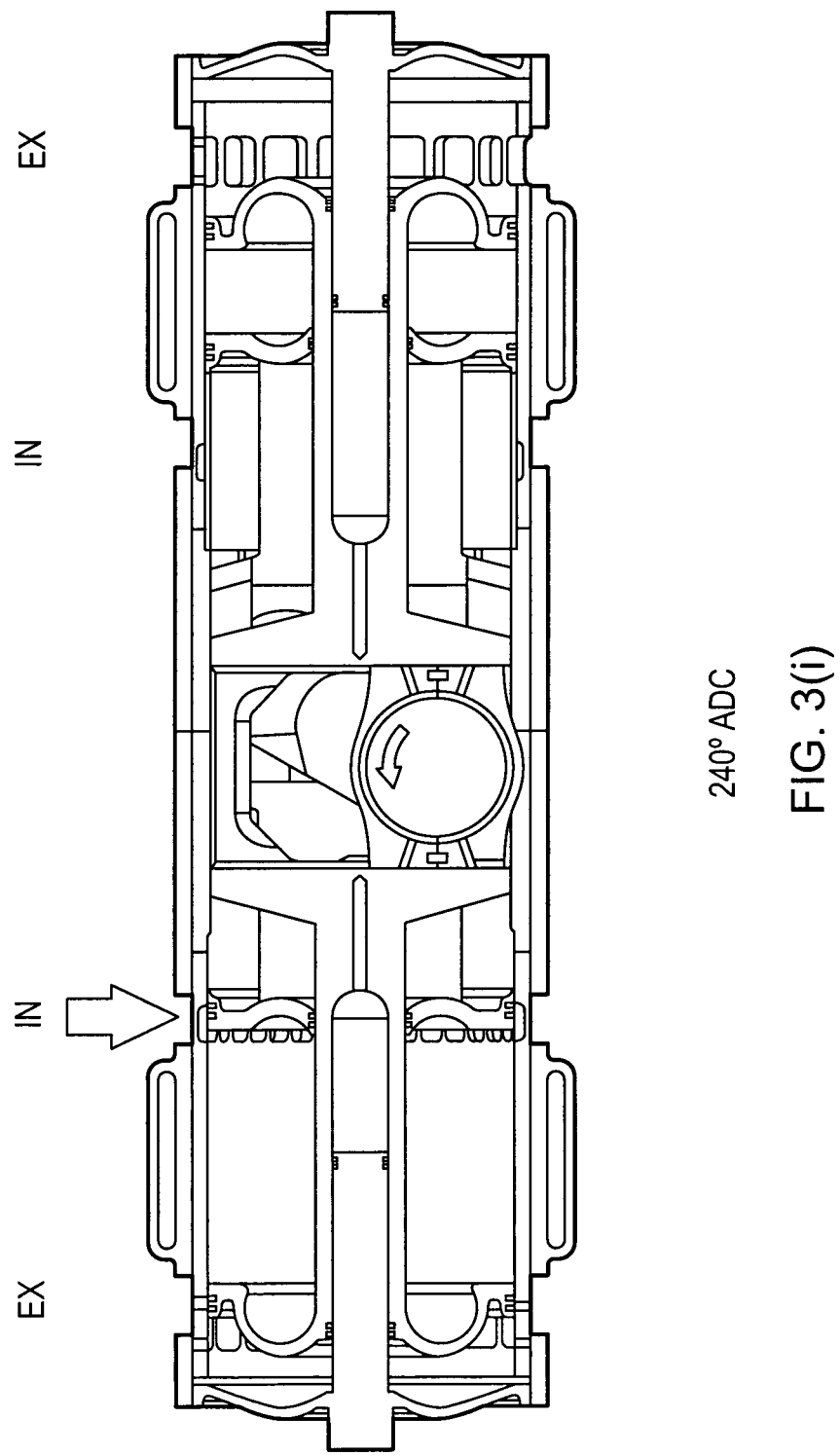
FIG. 3(i)  240° ADC

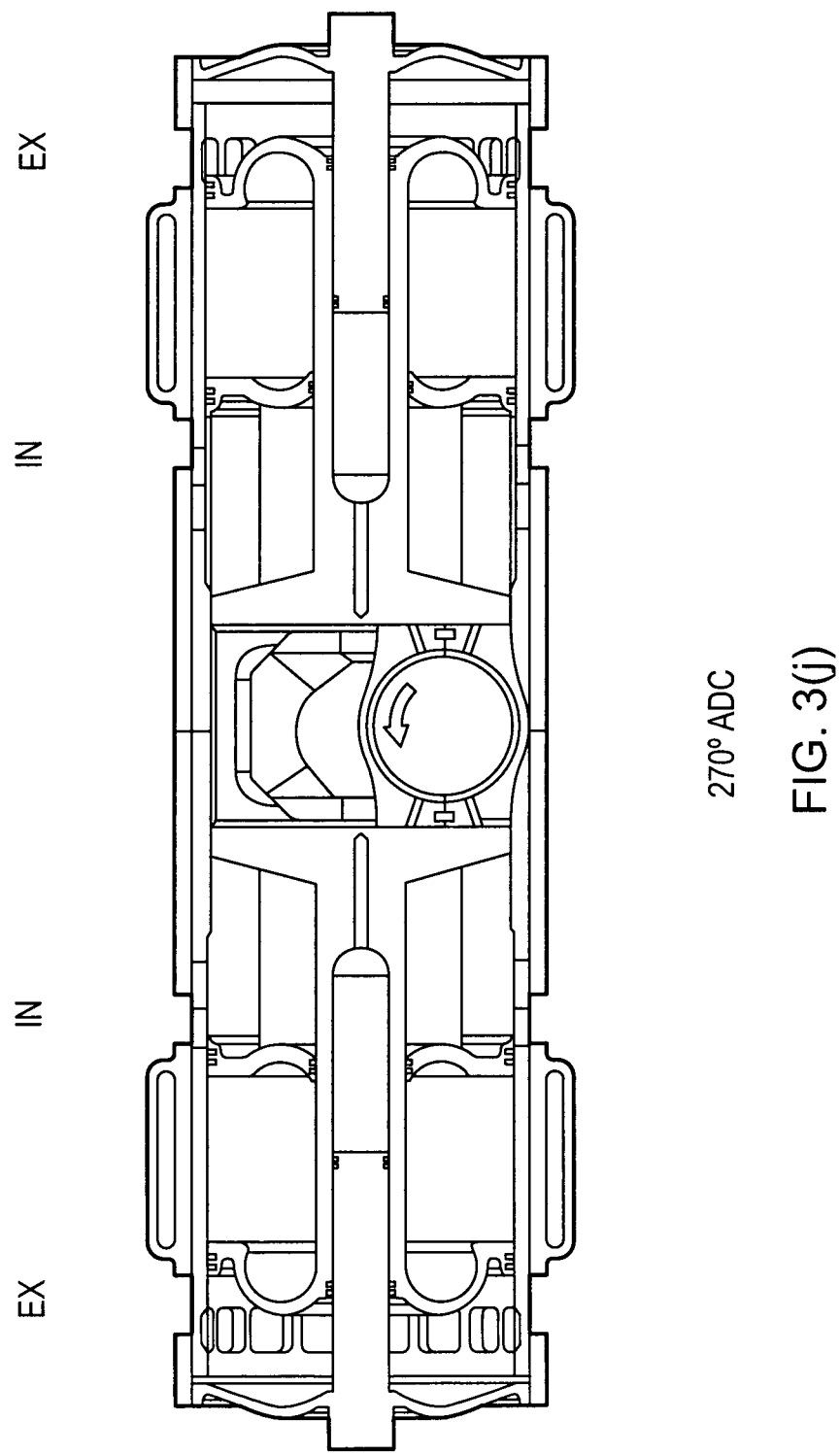
FIG. 3(j) 270° ADC

300° ADC

330° ADC

360° ADC

INTERNAL COMBUSTION ENGINES

CROSS-REFERENCE TO RELATED APPLICATIONS

This application claims priority to International Application No. PCT/GB2008/001798, filed on May 28, 2008, which claims priority to Great Britain Patent Application No. 0710852.5, filed Jun. 6, 2007, each of which is incorporated by reference in its entirety.

FIELD OF THE INVENTION

This invention relates to internal combustion engines. More particularly it relates to internal combustion engines with a piston-opposed, cylinder-opposed ("POCO") configuration.

BACKGROUND

The internal combustion engine has undergone very little change since the end of the Second World War and it is arguable that the piston engine in almost universal use today has more in common with design practice at the outbreak of WW2 than the developments that took place during it.

With the war over, the requirement was for something which was cheap and simple to produce, something that did not require especially advanced machining techniques or exotic materials. At the time, the Internal Combustion Engine was seen as nothing more than a stop gap until another technology took over, and this assumption has been repeated time and time again over the intervening decades.

The rotary engine was one of a number of post-war developments. The basic geometry of the rotary engine had been around since the age of steam, but the work done by Felix Wankel brought it to the point where it seemed to offer a viable solution. Compared to a conventional Internal Combustion Engine the Wankel was much smaller for a given capacity and offered the added bonus of near vibration-free running. By the end of the decade almost every major engine producer had bought licences from the Wankel Institute to produce rotary engines, but problems soon became apparent. The first, poor sealing of the rotor tips, was eventually overcome, although only after many product recalls and warranty claims had brought pioneering manufacturers near to bankruptcy. The second was inherent in the basic design. The geometry of the spinning rotor and the chamber wall in a Wankel force the combustion volume to be whatever is left over between the rotor and the chamber wall at the point of combustion. This leads to incomplete combustion due to the large area/volume ratio and inefficient shape. Poor fuel consumption was thought something the world could live with until the arrival of the first fuel crisis in 1974 but almost overnight, the Wankel was abandoned by all the major players except Mazda. With emissions as important today as fuel consumption, the inefficient combustion of the Wankel makes it hard to see it play any significant role in the future except in applications where the user is able to tolerate these deficiencies in exchange for its small size and smoothness.

Their fingers burned, manufacturers returned to conventional engines and waited for advances in what was accepted to be the power source of the future; the fuel cell. Developments in advanced batteries are also ongoing but it ironic that at the very time the first commercial electric vehicle can be realistically contemplated, there is a growing realisation that the Internal Combustion Engine will have a significant future for many years as a highly efficient unit on its own or as part of a hybrid powertrain.

In some respects, the designers of diesel engines for commercial use have been more adventurous with opposed piston 2-strokes being developed in Germany in the 1930s with the Junkers Jumo and in the 1950s and 60s with the Napier Deltic and the Commer TS3.

Having established the requirement for a modern piston engine, the question is what characteristics should it have?

For reasons of manufacturing efficiency and reliability in use, the engine should be as simple as possible with the minimum of moving parts. It should be as small as possible, so that it can be easily accommodated in whatever it is powering, improving the packaging of a vehicle, enhancing pedestrian safety and making its incorporation into a hybrid powertrain simpler.

It should be lightweight, so that minimum energy is used in moving its own mass, while a larger payload is made possible within a fixed gross vehicle weight.

It should use its fuel more efficiently than contemporary engines, meaning better combustion, less internal friction and reduced reciprocating masses.

If possible, it should be vibration free to improve the comfort of vehicle occupants and reduce the stresses in the chassis.

Theoretically, a 2-stroke engine has an advantage in achieving a greater output for its size, since each cylinder produces power every revolution. However, this potential has been compromised by excessive inlet and exhaust period overlap and the fact that piston-opposed 2-strokes have not traditionally had optimum asymmetry to achieve the most efficient combustion. Advances in fuels, injection systems and engine management mean that much of this can be overcome, with a cleaner engine emerging.

A 2-stroke internal combustion engine with opposed cylinders, each cylinder having a pair of opposed pistons connected to a common central crankshaft, has been disclosed by Hofbauer in U.S. Pat. No. 6,170,443. Independent angular positioning of the eccentrics on the crankshaft allows for asymmetrical timing of the intake and exhaust ports, thus optimising the inlet and exhaust port overlap. The effect of the resulting primary dynamic imbalance is minimised by controlling the geometrical configurations and masses of the moving parts in a complex manner.

Another contributor to the emissions produced and overall inefficiency of a conventional engine is that brought about by piston side thrust caused by connecting rod/crankshaft geometry, while frictional losses due to combustion forces acting directly on the big-end and main bearings are significant.

Improvements in all of these areas can only be beneficial.

SUMMARY OF THE INVENTION

The present invention is generally concerned with 2-cylinder 2-stroke internal combustion engines.

It is an object of the present invention to provide a 2-cylinder 2-stroke internal combustion engine having superior performance characteristics to current 4-cylinder 4-stroke engines but with improved efficiency, reduced height profile and lower mass for improved installation, adaptability to advanced supercharging and fuel injection methods, dynamic balance and mechanical simplicity for reduced production costs.

Accordingly, in a general aspect, the present invention provides a 2-stroke internal combustion engine comprising a crankshaft and two coaxial opposed cylinders.

Each cylinder preferably contains opposed inner and outer pistons reciprocatably disposed to form a combustion chamber between them. A scotch-yoke mechanism rigidly coupling the outer pistons is preferably provided to drivingly couple the outer pistons to the crankshaft. Preferably, two parallel scotch-yoke mechanisms equally disposed about the cylinders' centreline with just sufficient space between them to slidably receive the aforementioned outer pistons' single scotch-yoke, are provided, rigidly coupling the inner pistons to drivingly couple them to the crankshaft.

In some embodiments a hole is provided with sealing means in the crown of each inner piston to provide space for the motion of a rod connecting the outer pistons to their scotch-yoke mechanism. Thus, the outer pistons' scotch-yoke mechanism is nested within the two scotch-yoke mechanisms of the inner pistons.

In order to facilitate the assembly of the inner and outer pistons, a preferred feature of the invention is to split the inner pistons along a plane through the cylinders' axis and normal to the crankshaft's axis. The two halves of the inner pistons are then reattached with fasteners. It is recognised that alternative assembly methods may be employed to achieve the same effect.

Further, in accordance with the invention, the crankshaft preferably has at least three separate journals for receiving the driving forces from the respective scotch-yoke mechanisms. Each cylinder has exhaust ports and air intake ports formed near its respective ends.

A preferred feature of the invention is that fuel injection means are provided which deliver fuel through a number of radially disposed nozzles whose disposition axis is coaxial with the cylinders. During the injection period, an equal number of radially disposed ports in the outer pistons' tubular rods register with and envelop the fuel injection streams, hence allowing their entry into the combustion chambers.

An important preferred feature of the invention is that the masses of the inner and outer rigid piston/scotch-yoke/piston assemblies (API and APO) are selected so as to eliminate or minimise the engine's primary dynamic imbalance. Engines utilizing scotch-yoke mechanisms drive their pistons with pure Simple Harmonic Motion and therefore have no second or higher order harmonic motion components. More specifically, it is preferred to choose the mass of the API such that the product of its mass multiplied by the throw of its driving crankshaft journals is equal to the product of the mass of the APO multiplied by the throw of its driving crankshaft journal. This configuration eliminates dynamic imbalance unless crankshaft journal asymmetry is introduced.

According to a further preferred feature of the invention, the journals on the crankshaft driving the API and APO, instead of being diametrically opposed, are disposed asymmetrically so that the exhaust ports of the associated cylinder open before its air intake ports open and close before its air intake ports close. This asymmetric port timing makes it possible to improve exhaust gas scavenging and to utilize supercharging to enhance engine efficiency.

Once asymmetric piston motion is introduced into a piston-opposed engine, it is necessary to redefine the meaning of top dead centre (TDC) and bottom dead centre (BDC), which in the great majority of engine designs coincide with minimum and maximum volumes contained within the cylinder. In the case of a piston-opposed engine whose pistons are out of phase by an angle of $(180+\alpha)°$, where $\alpha$ is known as the out-of-phase angle (OOP), the position of minimum contained volume is known as inner dead centre (IDC) and the position of maximum contained volume is known as outer dead centre (ODC).

A further important preferred feature of the invention is the use of two sleeve-valves containing the inlet and exhaust ports and forming the cylinder within which the pistons reciprocate. It is a preferred feature of the invention that an eccentric, spherical journal at one end of the crankshaft drives one sleeve-valve, while a similar coaxial journal at the other end of the crankshaft drives the second sleeve-valve. In some embodiments the eccentric journals' maximum eccentricities lag the APO crankshaft journal by $(90+\alpha/2)°$.

It can be shown by algebraic trigonometry that when a kinematic arrangement as described above has an OOP angle $\alpha$, a primary out-of-balance force is generated lagging the APO journal position by $(90+\alpha/2)°$ and of magnitude $2\sin(\alpha/2)$ multiplied by the mass/crankthrow product of the API or APO. In order to achieve perfect dynamic balance, all that is necessary is to arrange for the product of the sum of the masses of the two sleeve-valves multiplied by their eccentric journals' throw to be equal to the magnitude of the out-of-balance force described previously. Thus, the resulting engine is essentially in complete dynamic balance. It should be noted here that the rotational components of the motion of the sleeve-valves are in opposing directions and fully cancel each other. Also, since the opposed cylinders are coaxial, no rocking couples are generated and space is saved compared to a conventional horizontally opposed, staggered cylinder arrangement.

Another important reason for this feature of the invention is that the effect of having sleeve-valve motion lagging exhaust piston motion by $(90+\alpha/2)°$ is to multiply the port timing asymmetry by a factor of three or more, which allows piston asymmetry to be minimized, which in turn minimizes lost engine volume and internal out-of-balance components—a virtuous circle rare in engineering design.

A further desirable effect, well documented in the literature, is that the circular motion imparted to the sleeve-valves by their eccentrics, significantly reduces piston friction and cylinder wear due to the velocity of the piston rings relative to their cylinder, never becoming zero. Hydrodynamic lubrication is thereby maximized. At the same time, lubricating oil is more evenly spread, leading to higher reliability via a reduced chance of lubrication breakdown and improved heat transfer leading to reduced hot spots and temperature gradients.

Maximum power efficiency from an engine according to the present invention can be achieved by applying pressurized air to the intake ports of each cylinder. The presently preferred form of the engine with asymmetric timing according to the invention therefore includes two superchargers, each of which is coupled to the exhaust ports of an associated cylinder to receive blowdown gases from that cylinder and to apply pressurized air to the intake ports of that associated cylinder. Close coupling of a separate supercharger to each exhaust port ring results in greater efficiency by utilizing extra energy from the gas dynamic pulsations inherent in any piston engine.

According to another embodiment of the disclosed engine, the smaller of the two angles, summing to 360°, subtended by the scotch-yoke crankshaft journals is about one hundred and fifty-five degrees.

In still another embodiment of the disclosed engine, the second cylinder's sleeve-valve drivingly couples a second eccentric spherical journal, coaxial with the first, on the other end of the crankshaft, forcing the sleeve-valves to reciprocate in phase but rotate in opposite phase.

According to yet another embodiment of the disclosed engine, the smaller angle subtended by the scotch-yoke crankshaft journals is about one hundred and seventy-two degrees ($\alpha=8°$)

Continuing, in another embodiment of the disclosed engine, axes of the cylinders are parallel but are offset in opposing directions from the axis of the crankshaft.

BRIEF DESCRIPTION OF THE DRAWINGS

An embodiment of the invention is now described by way of example, with reference to the accompanying drawings in which:

FIGS. 3(a) to (m) show the relative positions of the component parts of the engine configuration of FIGS. 1 and 2 over one complete crankshaft rotation:

FIG. 3(a) shows the crankshaft in a starting position, with intake (IN) and exhaust (EX) ports open in the right-hand cylinder;

FIG. 3(b) shows the relative positions of all the components after 30 deg of anti-clockwise rotation; and FIGS. 3(c) to 3(m) show the relative positions of all the components after 60°, 90°, 120°, 150°, 180°, 210°, 240°, 270°, 300°, 330°, 360° respectively.

DETAILED DESCRIPTION

The following is a description of the preferred embodiment, but many variations are possible within the scope of the invention.

Figure 1:
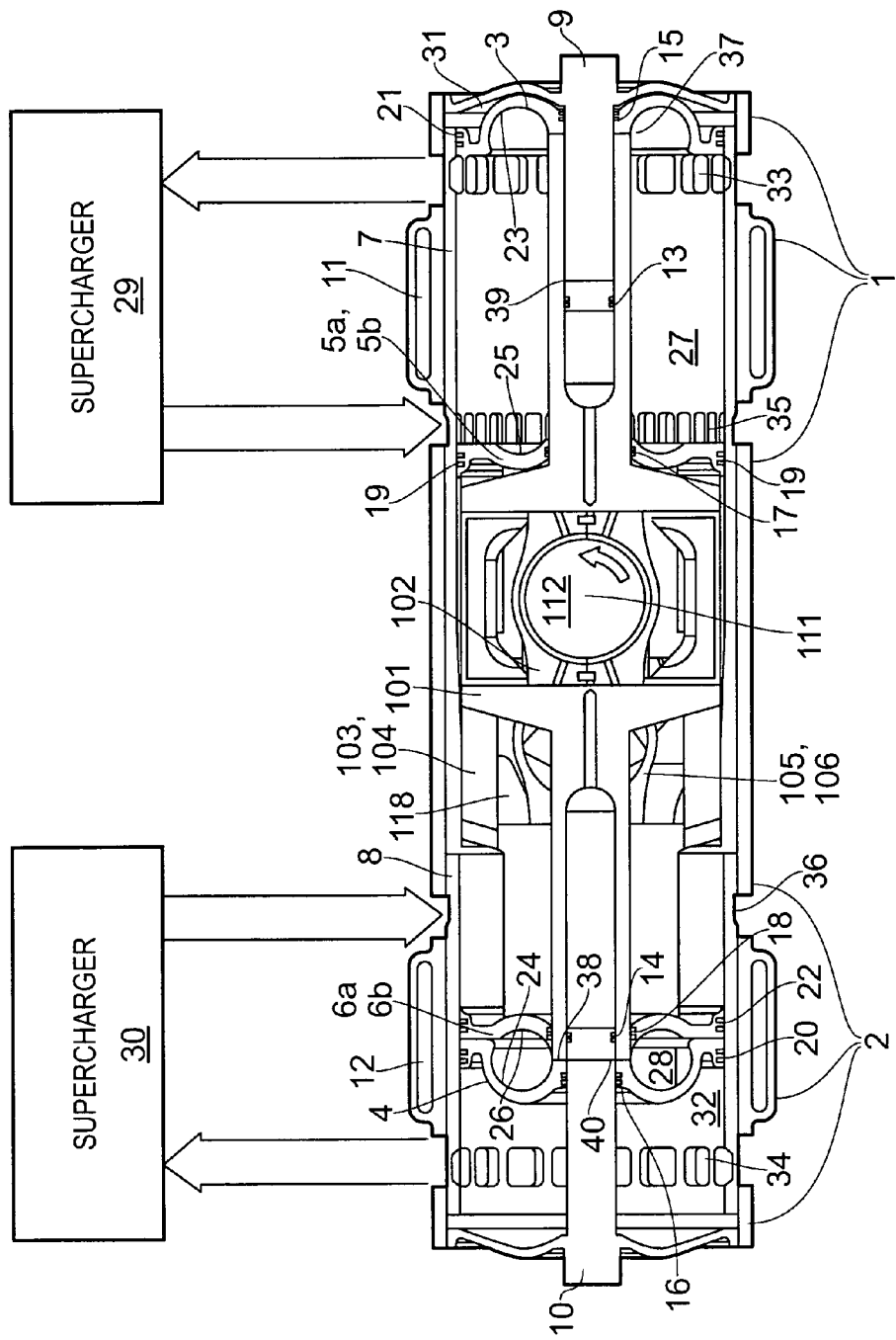
FIG. 1 is a cross-section through an engine configuration according to an embodiment of the present invention, the cross-section lying on a vertical plane passing through the axis of the left- and right-hand cylinders and normal to the axis of the crankshaft.
Figure 2:
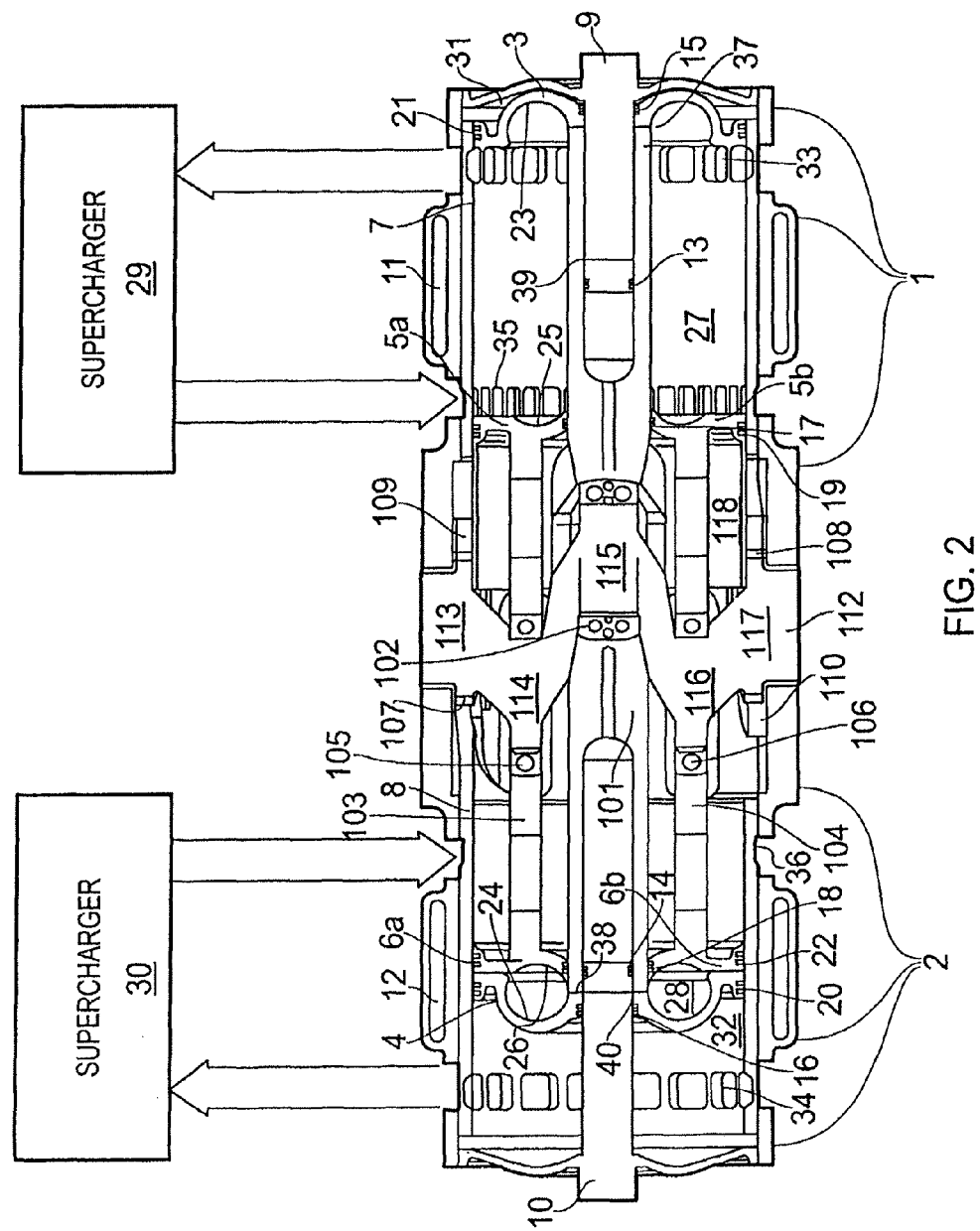
FIG. 2 is a cross-section through an engine configuration according to an embodiment of the present invention, the cross-section lying on a horizontal plane passing through the axis of the left- and right-hand cylinders and the axis of the crankshaft.

As illustrated in FIGS. 1 and 2, the engine configuration of the present invention comprises a right cylinder 7, a left cylinder 8 and a single central crankshaft 112 located between the cylinders (for clarity, most of the supporting structure of the engine, apart from 1 and 2 has been omitted from FIGS. 1 and 2).

The right cylinder 7 has an outer piston ($P_{RO}$) 3 and an inner piston ($P_{RO}$) 5 with combustion faces 23 and 25 respectively, the two pistons forming a combustion chamber 27 between them. The left cylinder 8 similarly has an outer piston 4 ($P_{LO}$) and an inner piston ($P_{LI}$) 6, with combustion faces 24 and 26 and combustion chamber 28. The two outer pistons 3 and 4 are rigidly connected together by the scotch yoke 101. The two upper, inner piston halves 5a and 6a are rigidly connected together by the upper scotch yoke 103 and the two lower, inner piston halves 5b and 6b are rigidly connected together by the lower scotch yoke 104. In the preferred embodiment, in order to enable assembly, the two resulting inner piston/scotch yoke/piston halves, whose split line is through the cylinders' axes and normal to the crankshaft's axis, are rigidly fastened together at the same time trapping the piston ring seal groups 17 and 18.

The outer piston/scotch yoke/piston system 3, 101 and 4 is attached to the middle eccentric 115 of five eccentrics on the crankshaft 112 via a slipper 102. The inner piston/scotch yoke/piston system is attached to the inner pair of eccentrics 114 and 116 of the five eccentrics on the crankshaft 112 via slippers 105 and 106. The four pistons 3, 4, 5(a+b) and 6(a+b) are shown with a plurality of piston rings 19, 20, 21 and 22 respectively, located behind the combustion faces. In other embodiments of the engine, additional piston rings may be employed further along the piston bodies or in the mating cylinder wall to minimize the escape of gases from the ports to the crankcase 118. In the preferred embodiment, additional piston rings are employed in the outer zones 31 and 32.

The cylinders consist of sleeve valves 7 and 8 and their respective bearing caps 110 and 109, which are driven from the crankshaft by eccentrics 113 and 117 respectively. Sleeve valves 7 and 8 each have exhaust ports 33, 34 and intake ports 35 (intake ports of left-hand sleeve valve 8 not shown). On the right cylinder's sleeve valve 7, the outer piston 3 opens and closes exhaust ports 33 and the inner piston 5(a+b) opens and closes inlet ports 35. Multiple radial fuel injection ports 37 pierce the outer piston's tubular attachment and provide a path for fuel from the multiple radial fuel injection nozzles 39 of injector 9 to access the combustion chamber 27 only when the ports 37 register and envelop the nozzles 39 during the injection phase. Similarly, on the left cylinder's sleeve valve 8, the outer piston 4 opens and closes exhaust ports 34 and the inner piston 6(a+b) opens and closes inlet ports 36. Multiple radial fuel injection ports 38 pierce the outer piston's tubular attachment and provide a path for fuel from the multiple radial fuel injection nozzles 40 of injector 10 to access the combustion chamber 28 only when the ports 38 register and envelop the nozzles 40 during the injection phase (which, as shown in FIGS. 1 and 2, is taking place in the left cylinder).

Each of the five crankshaft eccentrics 113, 114, 115, 116 and 117 are uniquely positioned with respect to the crankshaft rotational axis 111. In the illustrated embodiment, the eccentric for the outer exhaust pistons 115 and the coaxial eccentrics for the inner intake pistons 114 and 116 are at the same radial distance from the crankshaft rotational axis 111. In the preferred embodiment, the scotch yoke 101 is alternately received within the skirts of the inner intake pistons 5(a+b) and 6(a+b) and the radius of eccentric 115 is thereby restricted. However, there is no equivalent restriction on the radii of coaxial eccentrics 114 and 116, therefore it is possible to extend the radius of these eccentrics which would have the effect of increasing the stroke of the inner intake pistons. Previous piston-opposed 2-stroke engines have, according to the literature, intake periods of about 110° and exhaust periods of about 130° of crankshaft rotation. Since maximum available port area varies linearly with the stroke of the associated piston, extra intake piston stroke would restore the equality of the intake and exhaust port areas. Whether this is desirable for any given engine embodiment according to its size and duty will depend on further computer analysis and testing for optimisation on a case by case basis.

The eccentric 115 for the outer exhaust pistons, which open and close the exhaust ports in the two cylinders, is angularly advanced in the preferred embodiment by 4°, while the coaxial eccentrics 114 and 116 for the inner intake pistons, which open and close the intake ports in the two cylinders, are angularly retarded by 4° (with respect to their theoretical 180° opposed positions in an engine embodiment with symmetrical port timing) and the coaxial eccentrics 113 and 117 which drive the cylinder sleeve valve motion are angularly retarded by (90+4)° with respect to the position of eccentric 115 (note that the direction of crankshaft rotation is counter-clockwise, as indicated by the arrows).

The unique positions of the eccentrics contribute both to engine balance and to engine operation with respect to supercharging and recovering energy from the exhaust blowdown, as discussed below. The engine balance results in all non-rotational forces on the crankshaft cancelling, thus permitting a simplified crankshaft design, as also discussed below. The use of pistons opposed, achieves a larger swept volume per cylinder while at the same time reducing the crankshaft throws, thereby reducing the engine height. The nested scotch yoke configuration allows for a very short, compact engine, while greatly reducing frictional losses from reaction forces through the piston/cylinder interfaces.

Compared to a current state-of-the-art production 4-cylinder 4-stroke in-line engine having comparable performance, the engine of the present invention provides substantial improvements in installation suitability, the reduction of friction losses and the elimination of vibration. The height of the opposed piston, opposed cylinder engine is determined primarily by the maximum sweep of the crankshaft and the minimum available clutch diameter and by flywheel requirements. With the piston-opposed design, the crankshaft throws may be cut roughly in half for the same cylinder displacement. A height reduced to approximately 200 mm is therefore possible, compared to a height of 450 mm for a 4-cylinder 4-stroke in-line engine. As an illustration, an engine embodying the present invention having a bore of 46.6 mm would yield a swept volume of 158 cm$^3$. The single central crankshaft and nested scotch-yoke configuration permit a uniquely compact engine which, in a prototype design with a width of approximately 720 mm, is within the available installation width for automobiles, commercial vehicles and light aircraft, etc. With a bore and stroke of 152×83.5 mm, a swept volume of 5.5 liters results. A mass of approximately 130 kg with superchargers and accessories can be expected. Smaller versions would be required for most mass-production applications.

Friction due to reaction forces through the piston/cylinder interfaces is greatly reduced by this invention. A state-of-the-art 4-cylinder 4-stroke in-line engine has a crankshaft throw to connecting rod centres ratio ($\lambda$) of about 0.25. Because of the scotch-yoke mechanisms, a $\lambda$ value of infinity is achieved and perfect Simple Harmonic Motion of all the pistons results.

Although the 2-cylinder engine of the present invention has the same total number of pistons as a conventional 4-cylinder 4-stroke in-line engine, for a comparable power output, the mean piston velocity is substantially reduced since each piston travels a shorter distance.

The piston-opposed configuration substantially eliminates the non-rotational combustion forces on the main bearings, since the pull from the outer piston counteracts the push from the inner piston. These large forces primarily stress the crankshaft in double shear and impose an almost pure torque on the crankshaft. The number of main bearings can therefore be reduced to two and the crankshaft and supporting engine structure may be made correspondingly lighter.

The engine of the present invention can be totally dynamically balanced as discussed below even with substantial asymmetry in the exhaust and intake port timings. This is achieved through the use of the mass/eccentric throw products of the sleeve valves exactly counteracting the unbalanced component of the mass/eccentric throw products of the two piston/scotch-yoke/piston systems. Furthermore, the motion of the sleeve-valves modifies the exhaust and intake port timing in such a way that the port timing asymmetry can be at least three times the asymmetry of the crankshaft eccentrics.

The engine configuration of the present invention is well suited to supercharging. As shown in FIGS. 1 and 2, in the preferred embodiment, each cylinder of the engine has a separate supercharger 29 and 30. With only two cylinders, a supercharger may be economically dedicated to each cylinder, making more practical such techniques as pulse turbocharging. The superchargers are preferably electric motor assisted turbochargers, which serve to improve scavenging, improve engine performance at low engine speeds while avoiding turbo lag and recovering energy from the engine's exhaust (compounding) as described below as well as preheating the intake air for ease of cold starting.

Operation of the Engine

FIG. 3 illustrate the operation of the engine of the present invention over one complete crankshaft rotation. FIGS. 3(*a*) to 3(*m*) illustrate the piston positions, sleeve-valve and associated exhaust and intake port positions at 30° increments (note that crankshaft rotation in FIG. 3 is counter-clockwise as shown by the arrows). Crankshaft angle $\phi$ is shown to the right of the FIG. number and labelled ADC (after dead centre) since the pistons in the left and right cylinders are simultaneously at IDC (inner dead centre) and ODC (outer dead centre) respectively. Arrows at the inlet ports IN and outlet ports EX indicate that the ports are open.

FIG. 3(*a*) at 0° ADC shows the engine at a crankshaft position of 0° (arbitrarily defined as IDC in the left cylinder). At this position, the left outer piston $P_{LO}$ and the left inner piston $P_{LI}$ are at their point of closest approach. At approximately this angle of crankshaft rotation, in a direct-injection version of the engine, a fuel charge would be injected into the left cylinder and combustion would begin. At this point, the exhaust and intake ports (EX and IN) of the left cylinder are completely closed by $P_{LO}$ and $P_{LI}$ respectively. Since the timing of the pistons actuating the exhaust ports is advanced by 4° and the timing of the pistons actuating the intake ports is retarded by 4°, both pistons $P_{LO}$ and $P_{LI}$ have a slight velocity to the left, $P_{LO}$ having just changed direction. In the right cylinder, the right outer piston $P_{RO}$ and the right inner piston $P_{RI}$ are at their point of furthest separation. Both the exhaust and intake ports EX and IN of the right cylinder are open as shown by the arrows and the exhaust gases from the previous combustion cycle are being uniflow scavenged (flow in one direction rather than looping flow). Like the pistons in the left cylinder, both $P_{RO}$ and $P_{RI}$ must also have a slight velocity to the left since they are connected rigidly by nested scotch-yoke mechanisms, $P_{RO}$ having just changed direction. Both sleeve valves, which move as one and lag the motion of pistons $P_{LO}$ and $P_{RO}$ by (90+4)° and lead the motion of pistons $P_{LI}$ and $P_{RI}$ by (90+4)°, are at mid-stroke with maximum velocity to the right thereby causing no effective change to the port timing.

In FIG. 3(*b*) at 30° ADC, pistons $P_{LO}$ and $P_{LI}$ of the left cylinder are moving apart at the beginning of the power stroke, PLI having changed its direction of travel. $P_{LO}$, since it leads $P_{LI}$ by 8°, is moving at a higher velocity than $P_{LI}$. In the right cylinder, both sets of ports EX and IN remain open as shown by the arrows but ports EX are beginning to close. Both sleeve valves are 50% of their eccentrics' throw to the right of the mid-stroke position and still moving to the right thereby increasing the opening of the intake ports IN and reducing the opening of the exhaust ports EX in the right cylinder.

In FIG. 3(*c*) at 60° ADC, the left cylinder continues its power stroke, with the two pistons $P_{LO}$ and $P_{LI}$ having more nearly equal but opposite velocities. In the right cylinder, outer piston $P_{RO}$ has closed the exhaust ports EX, while the intake ports IN remain partially open to receive supercharge as shown by the arrow. Both sleeve valves are 87% of their eccentrics' throw to the right of the mid-stroke position and still moving to the right thereby increasing the opening of the intake ports IN and have hastened the closure of the exhaust ports EX in the right cylinder.

In FIG. 3(*d*) at 90° ADC, the left cylinder continues its power stroke, while in the right cylinder, $P_{RI}$ has closed the intake ports IN and the two pistons $P_{RO}$ and $P_{RI}$ are moving towards each other, compressing the air between them. Both sleeve valves are 100% of their eccentrics' throw to the right of the mid-stroke position and stationary and have delayed the closure of the intake ports IN in the right cylinder.

Figure 3B:
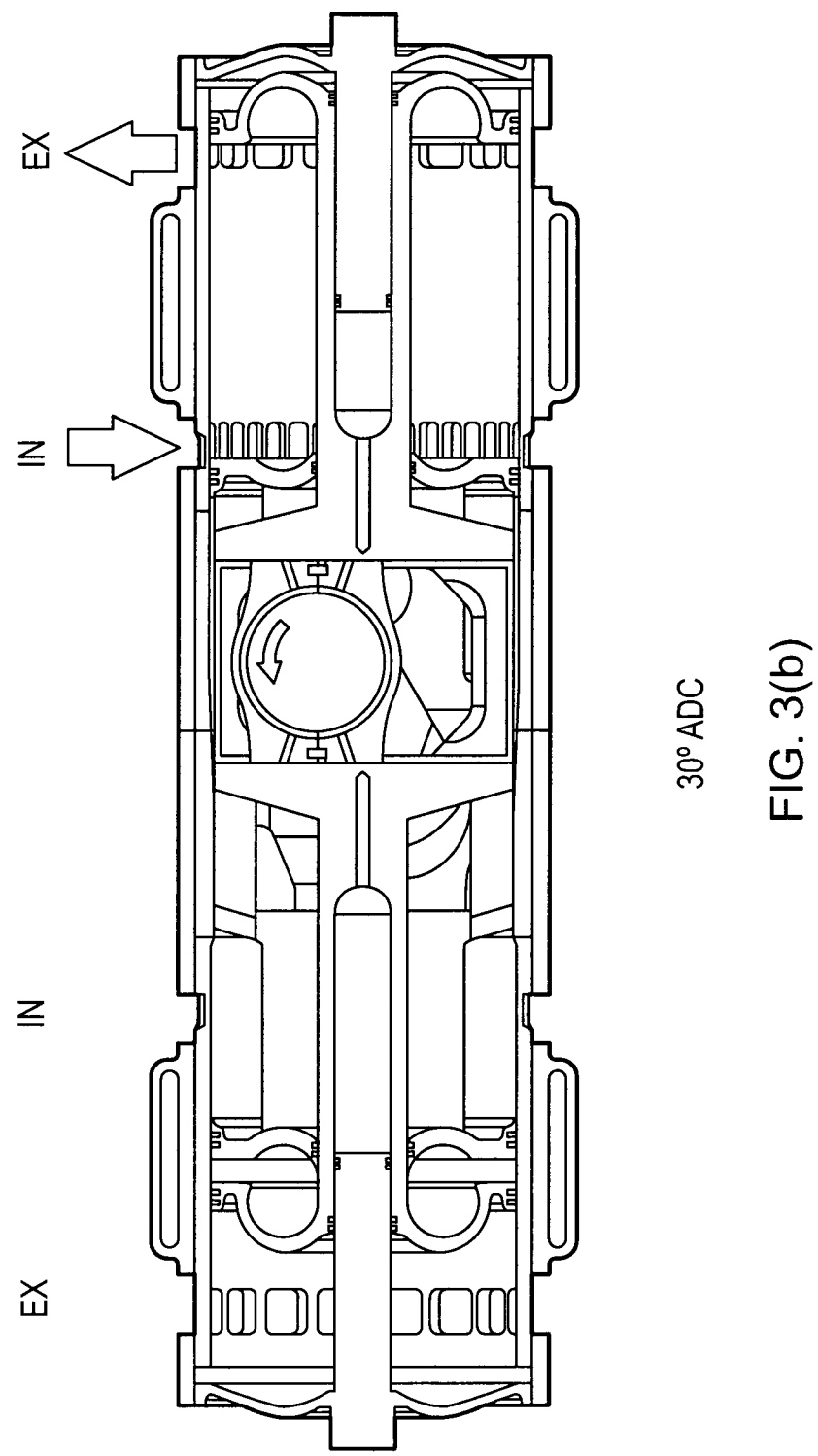
Figure 3D:
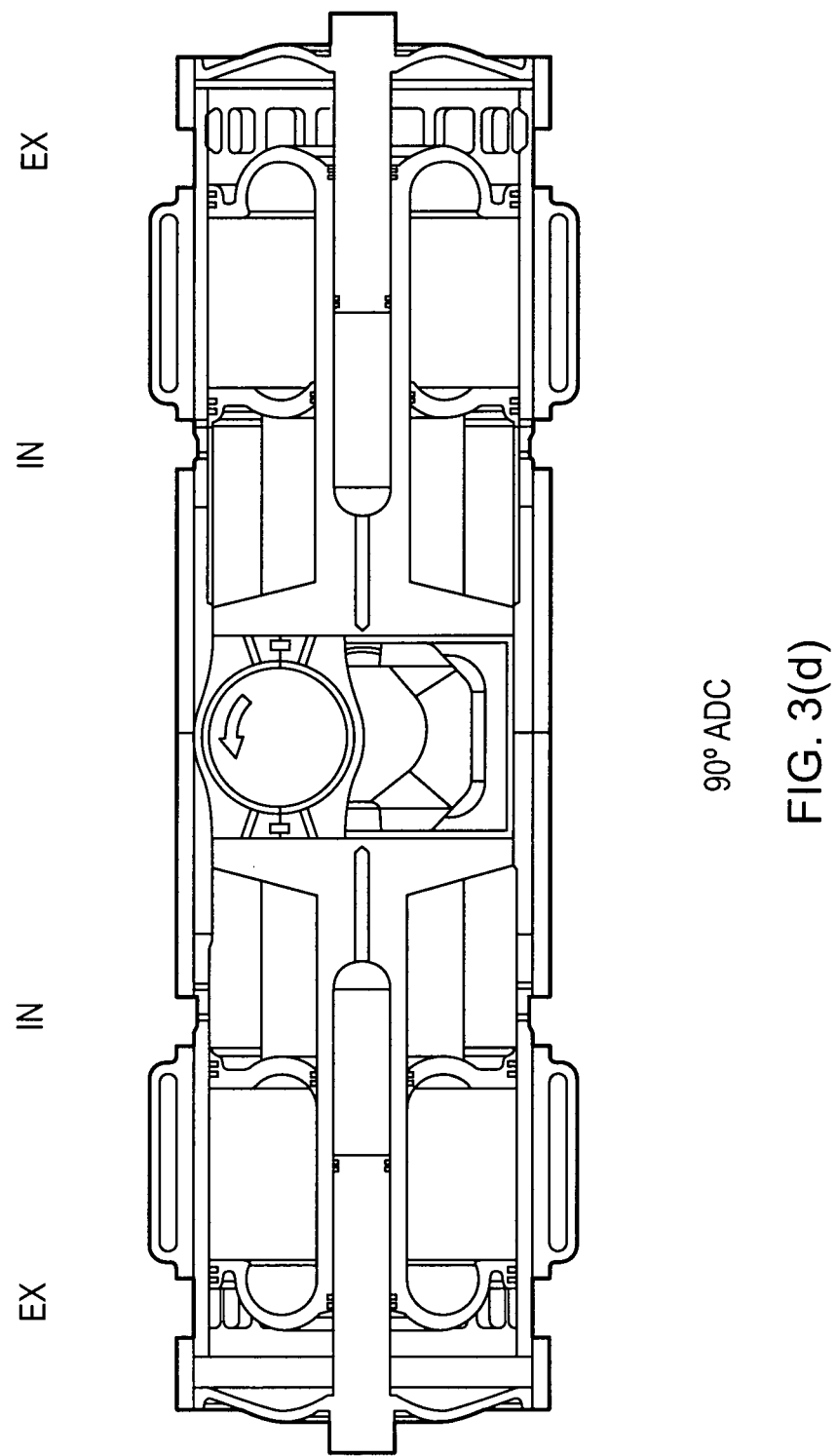
Figure 3E:
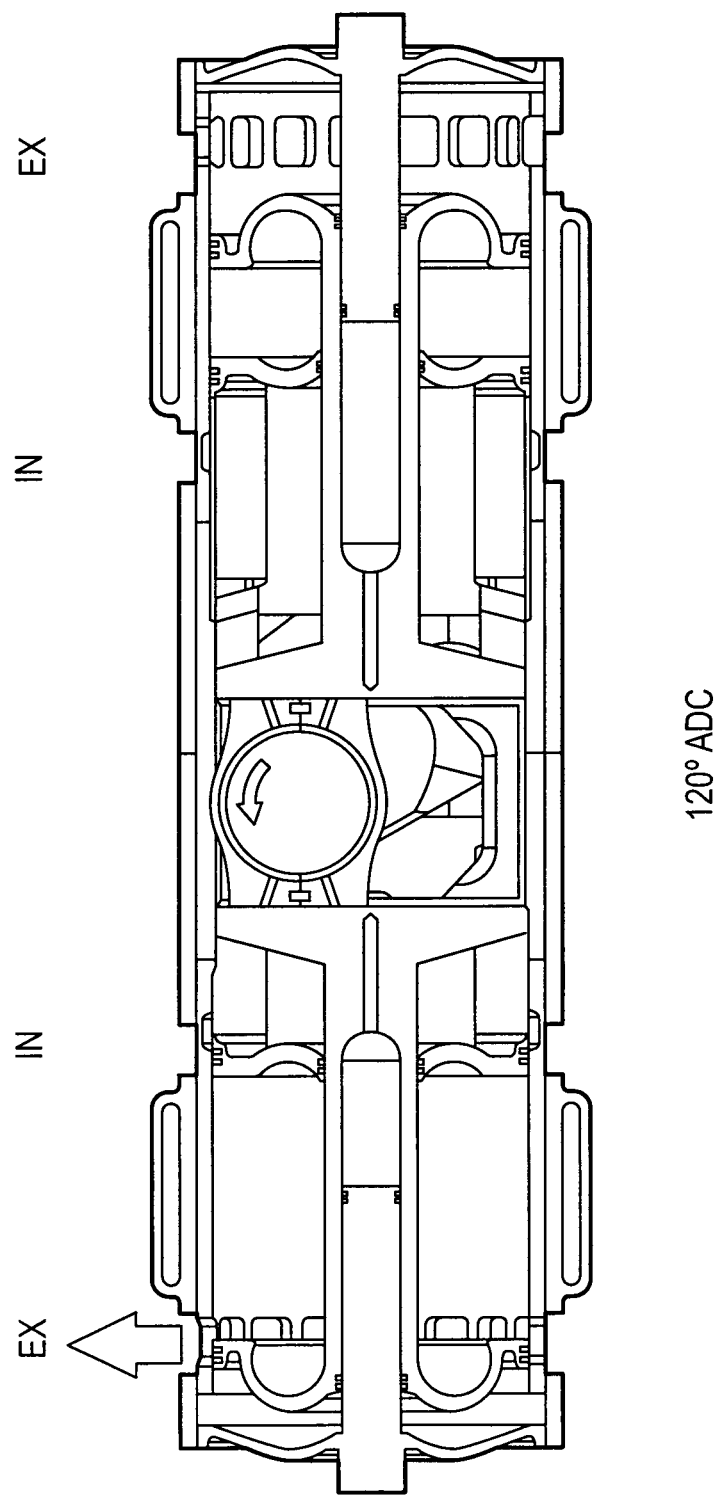

In FIG. 3(e) at 120° ADC, piston $P_{LO}$ of the left cylinder has opened exhaust ports EX as shown by the arrow, while the intake ports remain closed. In this "blowdown" condition, some of the kinetic energy of the expanding gases from the combustion chamber can be recovered externally by the turbocharger ("pulse" turbocharging) for compressing the next charge and/or generating electrical energy which may be stored and/or fed back into the engine's crankshaft (compounding). In the right cylinder, pistons $P_{RO}$ and $P_{RI}$ continue the compression stroke. Both sleeve valves are 87% of their eccentrics' throw to the right of the mid-stroke position and moving to the left thereby increasing the opening of the exhaust ports EX and have delayed the opening of the intake ports IN in the left cylinder.

Figure 3F:
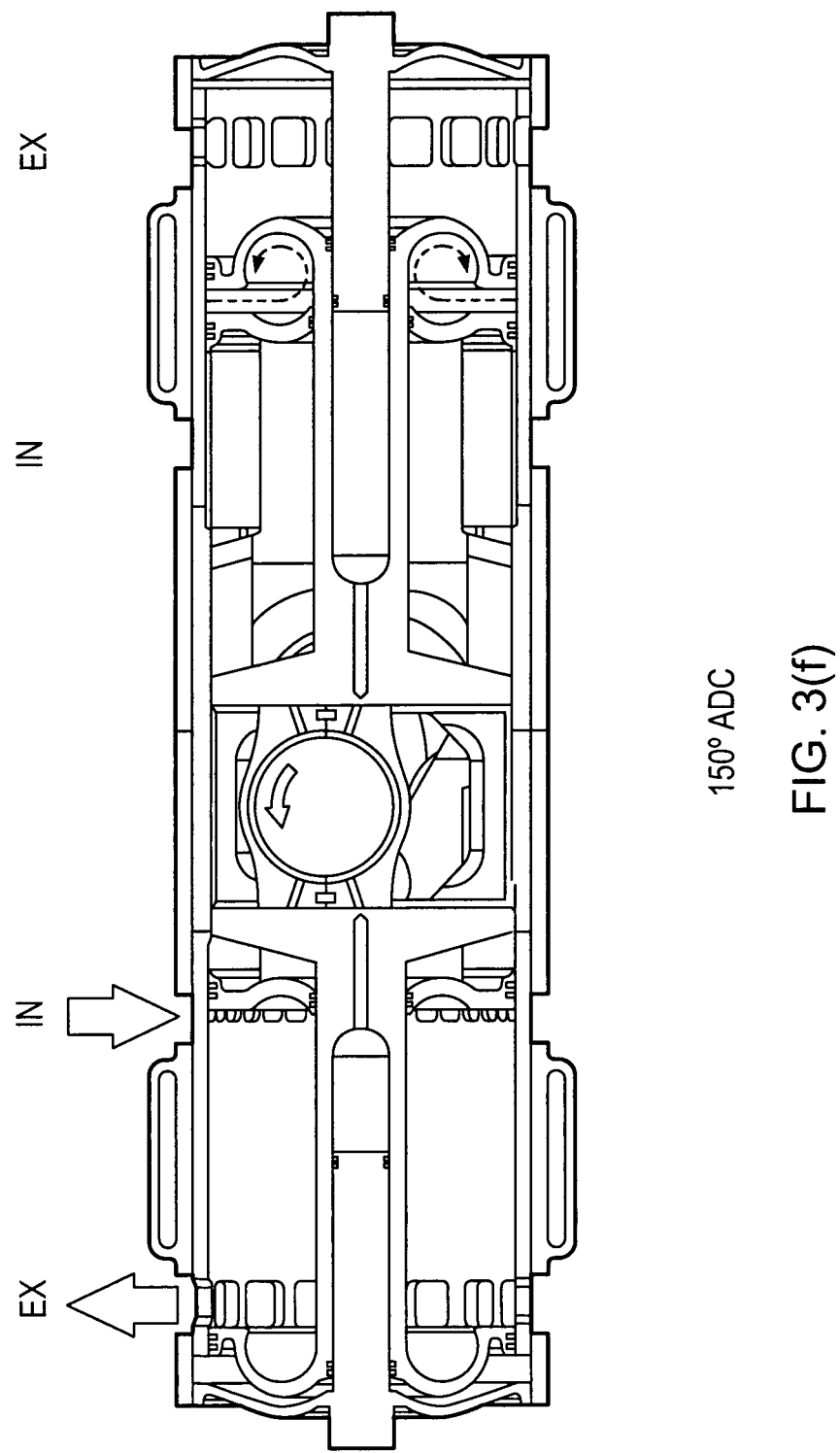

In FIG. 3(f) at 150° ADC, piston $P_{LO}$ of the left cylinder has opened the intake ports IN and the cylinder is being uniflow scavenged as shown by the arrows. The right cylinder is nearing the end of the compression stroke and the "squish" phase is beginning. This is where the outer, annular, opposite faces of pistons $P_{RO}$ and $P_{RI}$ begin to expel air from between them as shown by the arrows with dashed tails. Both sleeve valves are 50% of their eccentrics' throw to the right of the mid-stroke position and still moving to the left thereby increasing the opening of the exhaust ports EX and reducing the opening of the intake ports IN in the left cylinder.

In FIG. 3(g) at 180° ADC, pistons $P_{LO}$ and $P_{LI}$ of the left cylinder are causing both ports EX and IN to remain open as shown by the arrows and uniflow scavenging continues. The outer piston $P_{LO}$ has just changed its direction of travel. The right cylinder has reached the IDC position, where pistons $P_{RO}$ and $P_{RI}$ are at their position of closest approach, $P_{RO}$ having just changed direction. The "squish" phase continues as indicated by the arrows with dashed tails, causing an intensifying "smoke ring" effect to be superimposed on the already existing cylinder axis swirl caused by the partially tangential intake ports IN. These compound gas motions will be at their most intense at IDC when the combustion chamber most nearly resembles a toroid and is of minimum volume. At this point, multiple radial fuel sprays emanate from the central fuel injector as indicated by the fields of dots, reaching almost all of the available air and causing very efficient combustion leading, with compounding, to best-in-class specific fuel consumption. Both sleeve valves are at mid-stroke with maximum velocity to the left thereby causing no effective change to the port timing.

In FIG. 3(h) at 210° ADC, in the left cylinder, both sets of ports EX and IN remain open as shown by the arrows but ports EX are beginning to close. Pistons $P_{RO}$ and $P_{RI}$ of the right cylinder are moving apart at the beginning of the power stroke, $P_{RI}$ having changed its direction of travel. $P_{RO}$, since it leads $P_{RI}$ by 8°, is moving at a higher velocity than $P_{RI}$. Both sleeve valves are 50% of their eccentrics' throw to the left of the mid-stroke position and still moving to the left thereby increasing the opening of the intake ports IN and reducing the opening of the exhaust ports EX in the left cylinder.

Figure 3K:
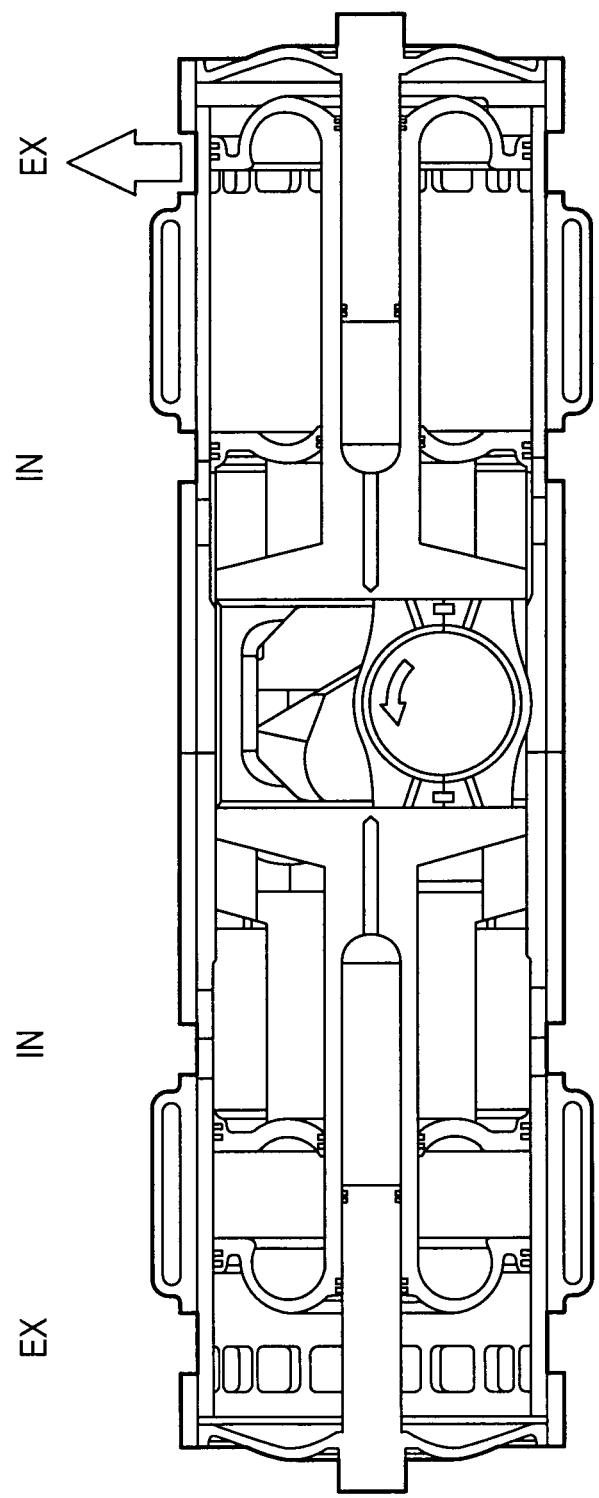
Figure 3I:
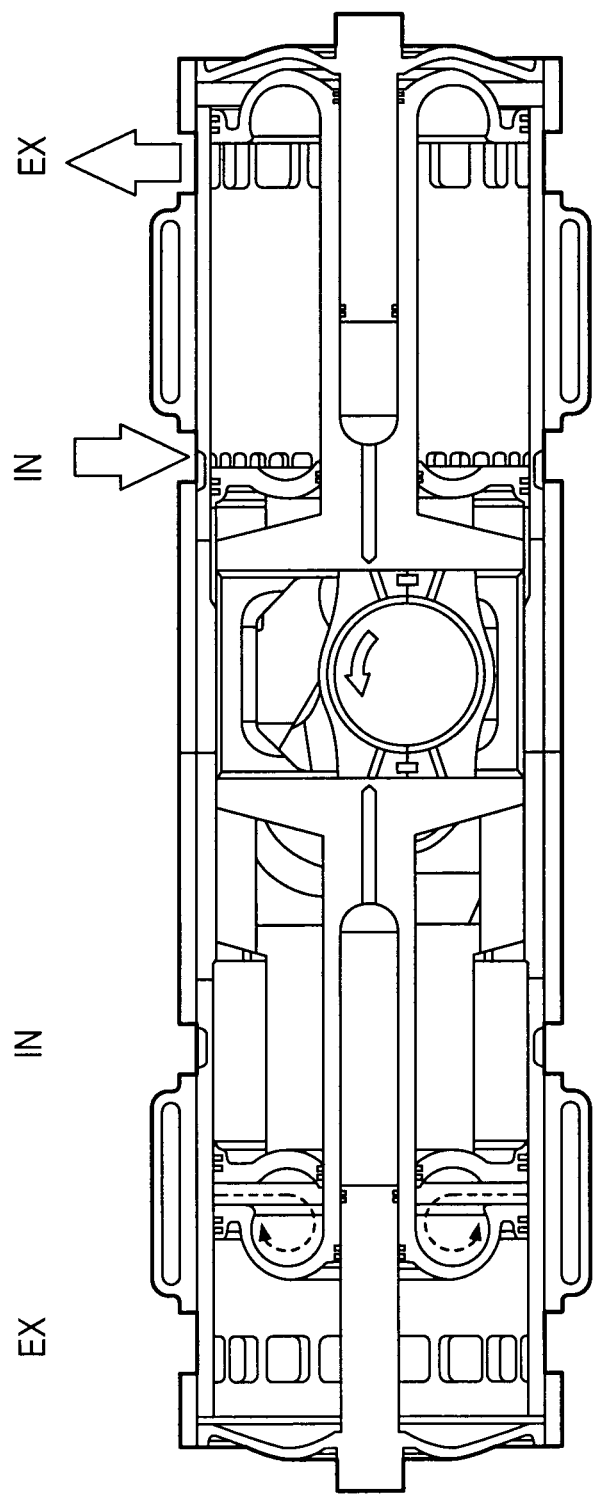

In FIG. 3(i) at 240° ADC, in the left cylinder, outer piston $P_{LO}$ has closed the exhaust ports EX, while the intake ports IN remain partially open to receive supercharge as shown by the arrow. The right cylinder continues its power stroke, with the two pistons $P_{RO}$ and $P_{RI}$ having more nearly equal but opposite velocities. Both sleeve valves are 87% of their eccentrics' throw to the left of the mid-stroke position and still moving to the left thereby increasing the opening of the intake ports IN and have hastened the closure of the exhaust ports EX in the left cylinder.

In FIG. 3(j) at 270° ADC, in the left cylinder, $P_{LI}$ has closed the intake ports IN and the two pistons $P_{LO}$ and $P_{LI}$ are moving towards each other, compressing the air between them, while the right cylinder continues its power stroke. Both sleeve valves are 100% of their eccentrics' throw to the left of the mid-stroke position and stationary and have delayed the closure of the intake ports IN in the left cylinder.

In FIG. 3(k) at 300° ADC, in the left cylinder, pistons $P_{LO}$ and $P_{LI}$ continue the compression stroke. Piston $P_{RO}$ of the right cylinder has opened exhaust ports EX as shown by the arrow, while the intake ports remain closed. In this "blowdown" condition, some of the kinetic energy of the expanding gases from the combustion chamber can be recovered externally by the turbocharger ("pulse" turbocharging) for compressing the next charge and/or generating electrical energy which may be stored and/or fed back into the engine's crankshaft (compounding). Both sleeve valves are 87% of their eccentrics' throw to the left of the mid-stroke position and moving to the right thereby increasing the opening of the exhaust ports EX and have delayed the opening of the intake ports IN in the right cylinder.

In FIG. 3(l) at 330° ADC, the left cylinder is nearing the end of the compression stroke and the "squish" phase is beginning. This is where the outer, annular, opposite faces of pistons $P_{LO}$ and $P_{LI}$ begin to expel air from between them as shown by the arrows with dashed tails. Piston PRO of the right cylinder has opened the intake ports IN and the cylinder is being uniflow scavenged as shown by the arrows. Both sleeve valves are 50% of their eccentrics' throw to the left of the mid-stroke position and still moving to the right thereby increasing the opening of the exhaust ports EX and reducing the opening of the intake ports IN in the right cylinder.

Figure 3M:
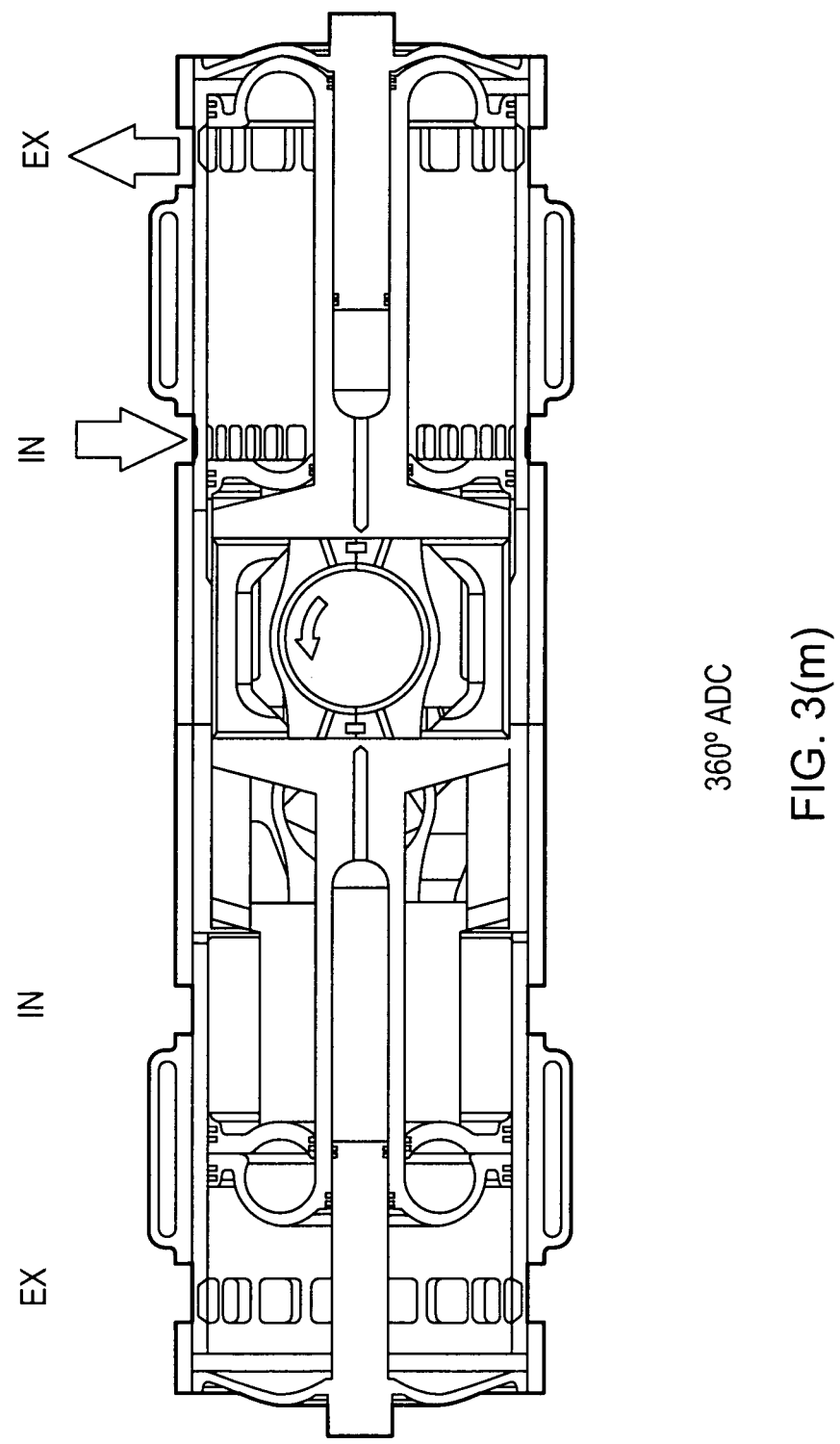

In FIG. 3(m) at 360° ADC, the position is the same as in FIG. 3(a). The left cylinder has reached the IDC position, where pistons $P_{LO}$ and $P_{LI}$ are at their position of closest approach, $P_{LO}$ having just changed direction. The "squish" phase continues as indicated by the arrows with dashed tails, causing an intensifying "smoke ring" effect to be superimposed on the already existing cylinder axis swirl caused by the partially tangential intake ports IN. These compound gas motions will be at their most intense at IDC when the combustion chamber most nearly resembles a toroid and is of minimum volume. At this point, multiple radial fuel sprays emanate from the central fuel injector as indicated by the fields of dots, reaching almost all of the available air and causing very efficient combustion leading, with compounding, to best-in-class specific fuel consumption. Pistons $P_{RO}$ and $P_{RI}$ of the right cylinder are causing both ports EX and IN to remain open and uniflow scavenging continues as shown by the arrows. The outer piston PRO has just changed its direction of travel. Both sleeve valves are at mid-stroke with maximum velocity to the right thereby causing no effective change to the port timing.

The specific angles and timings depend on the crankshaft geometries and port sizes and locations; the above description is intended solely to illustrate the concepts of the invention.

Asymmetric Timing of the Exhaust and Intake Ports

Asymmetric timing of the exhaust and intake ports in a 2-stroke engine yields a number of important advantages. If the exhaust ports open before the intake ports, energy in the exhaust gases can be more effectively recovered by a turbocharger and if the exhaust ports close before the intake ports, the cylinder can be more effectively supercharged.

In the engine configuration of the present invention, the exhaust ports are controlled by the outer piston in each cylinder and the intake ports are controlled by the inner piston, as described above. This configuration not only allows for effective scavenging ("uniflow" scavenging) but also permits independent asymmetric timing of the exhaust and intake ports.

Asymmetric timing of the two pistons in each cylinder is achieved by changing the relative angular positions of the corresponding crankshaft journals. Positioning the journals for the exhaust and intake pistons 180° apart would result in the both pistons reaching their maximum and minimum excursions at the same time (symmetric timing). In the preferred embodiment of the present invention, the journals for the exhaust pistons are angularly advanced by 4° and the journals for the intake pistons are retarded by 4° (inner and outer dead centres thus still occur at the same crankshaft angle as in the symmetrically timed engine but both pistons have a small common velocity with respect to the cylinder). Added to this is the contribution of the common velocity of both sleeve valves, which contain all the exhaust and inlet ports and whose motion lags the exhaust pistons' inner dead centres by 90°. This motion, in the preferred embodiment, increases the effective exhaust piston lead to 12.5° and the effective intake piston lag to 12.5°. As a result, the exhaust ports open before the intake ports for "blowdown" and close before the intake ports for supercharging.

The mass/eccentric throw product of the sleeve valves can be matched in such a way as to completely eliminate the primary imbalance caused by the piston journals' asymmetry. This invention thus describes a 2-cylinder 2-stroke engine which can achieve perfect balance at primary and all higher orders. Furthermore, so long as the mass/eccentric throw products of the opposing piston/scotch yoke/piston systems remain equal, the exhaust and intake pistons' strokes may be different which allows optimisation of maximum available port areas for best performance.

Adaptability of the Piston-Opposed Cylinder-Opposed Configuration to Larger Engines In many engine configurations, balance depends on having four, six, eight or more cylinders arranged such that the free-mass forces contributed by the individual pistons cancel. Counter-rotating weights are also often employed, adding complexity, mass and frictional loss to the engines. An advantage of the present invention is that total balance may be achieved in a compact engine with only two cylinders. Larger, multi-cylinder engines may then be made by placing multiple 2-cylinder engines side-by-side and coupling their crankshafts together. The coupling may be by such means as a clutch under operator or logic control, allowing pairs of cylinders to be uncoupled when not needed at low loads. Engines currently exist which use less than all of their cylinders when run at partial load but the cylinders remain connected to the crankshaft and the pistons continue to move within the cylinders and therefore continue to be a parasitic frictional load on the engine.

CONCLUSION

The above is a detailed description of a particular embodiment of the invention. It is recognised that departures from the disclosed embodiments may be within the scope of this invention and that obvious modifications will occur to a person skilled in the art. This specification should not be construed to unduly narrow the full scope of protection to which the invention is entitled.

The corresponding structures, materials, acts and equivalents of all means or step plus function elements in the claims below are intended to include any structure, material or acts for performing the functions in combination with other claimed elements as specifically claimed.

The invention claimed is:

1. A 2-stroke internal combustion engine comprising:
a crankshaft having a plurality of journals;
two opposed cylinders having their inner ends adjacent to the crankshaft, each cylinder having inner and outer pistons reciprocatably disposed therein and forming a combustion chamber therebetween;
first and second scotch-yoke mechanisms, rigidly attached to the inner pistons, which, acting in unison, drivingly couple the inner pistons to their corresponding journals on the crankshaft; and
a third scotch-yoke mechanism, rigidly attached to the outer pistons, which drivingly couples the outer pistons to their corresponding journal on the crankshaft;
wherein each cylinder comprises a sleeve-valve with one or more exhaust ports at one end and one or more intake ports at the other;
wherein a rigid extension to the end of the sleeve-valve adjacent to the crankshaft contains a hole drivingly coupled to a first eccentric spherical journal on one end of the crankshaft, the extension being split at the hole's diameter through a plane normal to the cylinder's axis forming a removable cap fastened to the extension in order to enable assembly.

2. An engine according to claim 1, wherein the third scotch-yoke mechanism is rigidly attached to the outer pistons via rods passing through holes in the combustion faces of the inner pistons.

3. An engine according to claim 1, wherein the product of the effective mass of a first system comprising the outer pistons and the third scotch-yoke multiplied by the throw of the associated crankshaft journal is essentially equal to the product of the effective mass of a second system comprising the inner pistons and first and second scotch-yokes multiplied by the throw of the associated crankshaft journals, so that the dynamic imbalance due to the first system essentially cancels the dynamic imbalance due to the second system.

4. An engine according to claim 1, wherein each cylinder has exhaust ports and intake ports formed near its respective ends and fuel injection means communicating with its combustion chamber.

5. An engine according to claim 4, wherein the crankshaft journal(s) associated with the scotch-yoke mechanism(s) for each cylinder are asymmetrically arranged so that the exhaust port or ports of the associated cylinder open before its intake port or ports open and close before its intake port or ports close.

6. An engine according to claim 1, wherein the smaller of the two angles, summing to 360°, subtended by the scotch-yoke crankshaft journals is about one hundred and fifty-five degrees.

7. An engine according to claim 1, wherein the second cylinder's sleeve-valve drivingly couples a second eccentric spherical journal, coaxial with the first, on the other end of the crankshaft, forcing the sleeve-valves to reciprocate in phase but rotate in opposite phase.

8. An engine according to claim 1, wherein the complex motion imparted to the sleeve-valve by its associated crankshaft journal comprises a linear simple harmonic motion component along the cylinder's axis and a rotational component about the cylinder's axis.

9. An engine according to claim 1, wherein the journals driving the sleeve-valves are positioned to bisect the larger of two angles, subtended by the scotch-yokes' crankshaft journals.

10. A 2-stroke internal combustion engine comprising:

a crankshaft having a plurality of journals;

two opposed cylinders having their inner ends adjacent to the crankshaft, each cylinder having inner and outer pistons reciprocatably disposed therein and forming a combustion chamber therebetween;

first and second scotch-yoke mechanisms, rigidly attached to the inner pistons, which, acting in unison, drivingly couple the inner pistons to their corresponding journals on the crankshaft; and a third scotch-yoke mechanism, rigidly attached to the outer pistons, which drivingly couples the outer pistons to their corresponding journal on the crankshaft;

wherein each cylinder comprises a sleeve-valve with one or more exhaust ports at one end and one or more intake ports at the other;

wherein the mass of both sleeve-valves multiplied by the throw of one of their associated journals substantially equals $2 \sin(\alpha/2)$ multiplied by the mass of a system comprising the outer pistons and third scotch yoke or a system comprising the inner pistons and first and second scotch yokes multiplied by its associated crankshaft journal throw, where $\alpha$ is 180° minus the smaller angle subtended by the journals associated with the sleeve-valves.

11. An engine according to claim 10, wherein the smaller angle subtended by the scotch-yoke crankshaft journals is about one hundred and seventy-two degrees ($\alpha=8°$).

12. An engine according to claim 10, wherein both cylinders have their exhaust ports on their inner ends nearest the crankshaft and their intake ports on their outer ends furthest from the crankshaft.

13. An engine according to claim 10, wherein both cylinders have their exhaust ports on their outer ends furthest from the crankshaft and their intake ports on their inner ends nearest to the crankshaft.

14. An engine according to claim 10, wherein axes of the cylinders are parallel but are offset in opposing directions from the axis of the crankshaft.

15. An engine according to claim 10, wherein means are included for applying pressurised air to the intake ports of each cylinder.

16. An engine according to claim 10, wherein two superchargers are included, each being coupled to the exhaust ports of an associated cylinder to receive blowdown gases therefrom and to the intake ports of that associated cylinder to apply pressurised air thereto.

17. A 2-stroke internal combustion engine comprising:

a crankshaft having a plurality of journals;

two opposed cylinders having their inner ends adjacent to the crankshaft, each cylinder having inner and outer pistons reciprocatably disposed therein and forming a combustion chamber therebetween;

first and second scotch-yoke mechanisms, rigidly attached to the inner pistons, which, acting in unison, drivingly couple the inner pistons to their corresponding journals on the crankshaft; and a third scotch-yoke mechanism, rigidly attached to the outer pistons, which drivingly couples the outer pistons to their corresponding journal on the crankshaft;

wherein fuel injection means are provided for each cylinder, remote from the crankshaft, reciprocatably received within a tubular member attaching the outer piston to its associated scotch-yoke where multiple radial high pressure fuel jets are released during the injection phase around the time when the inner and outer pistons of the associated cylinder are at their position of closest approach, these jets accessing the associated combustion chamber via small radial holes made through the tubular member which register and envelop the jets during the injection period.

18. An engine according to claim 17, wherein compression of the fuel air mixture in the cylinder causes ignition of the fuel air mixture.

19. An engine according to claim 17, wherein the geometrical configurations and masses of the sleeve-valves are selected so as to counteract the dynamic imbalance caused by the asymmetric motions of the pistons.

20. A two-stroke internal combustion engine comprising:

a crankshaft; and two opposed cylinders having their inner ends nearest to the crankshaft, each cylinder having inner and outer pistons disposed therein and forming a combustion chamber therebetween, wherein each outer piston is drivingly coupled to the crankshaft by a respective tubular member extending generally axially through the combustion chamber, and wherein fuel injection means housed within the tubular members are arranged to inject fuel radially outwardly into the combustion chamber.

* * * * *

UNITED STATES PATENT AND TRADEMARK OFFICE
CERTIFICATE OF CORRECTION

PATENT NO. : 8,499,726 B2
APPLICATION NO. : 12/663519
DATED : August 6, 2013
INVENTOR(S) : David Cox Page 1 of 1

It is certified that error appears in the above-identified patent and that said Letters Patent is hereby corrected as shown below:

In the Specification

Column 1, In line 65, insert --is-- after "it"

Column 4, In line 67, insert --.-- after ")"

Signed and Sealed this
Twenty-second Day of October, 2013

Teresa Stanek Rea
*Deputy Director of the United States Patent and Trademark Office*